Feb. 18, 1941.   R. H. WICKEMEYER   2,232,580
HOUSING FOR ELECTRIC EXTENSION CORDS
Filed May 8, 1939   3 Sheets-Sheet 3
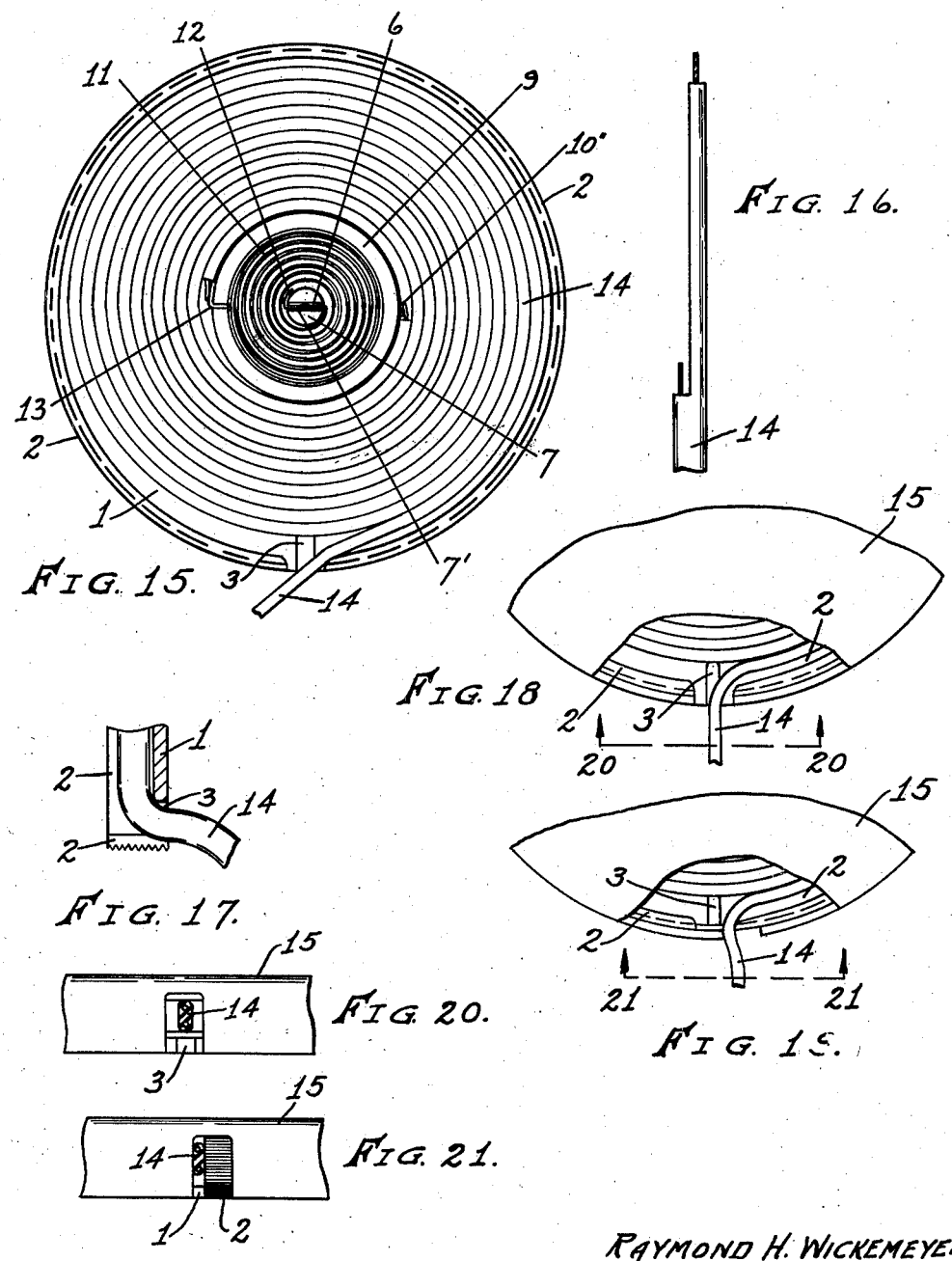
RAYMOND H. WICKEMEYER,
INVENTOR.
Donald E. Windle.
ATTORNEY Patented Feb. 18, 1941

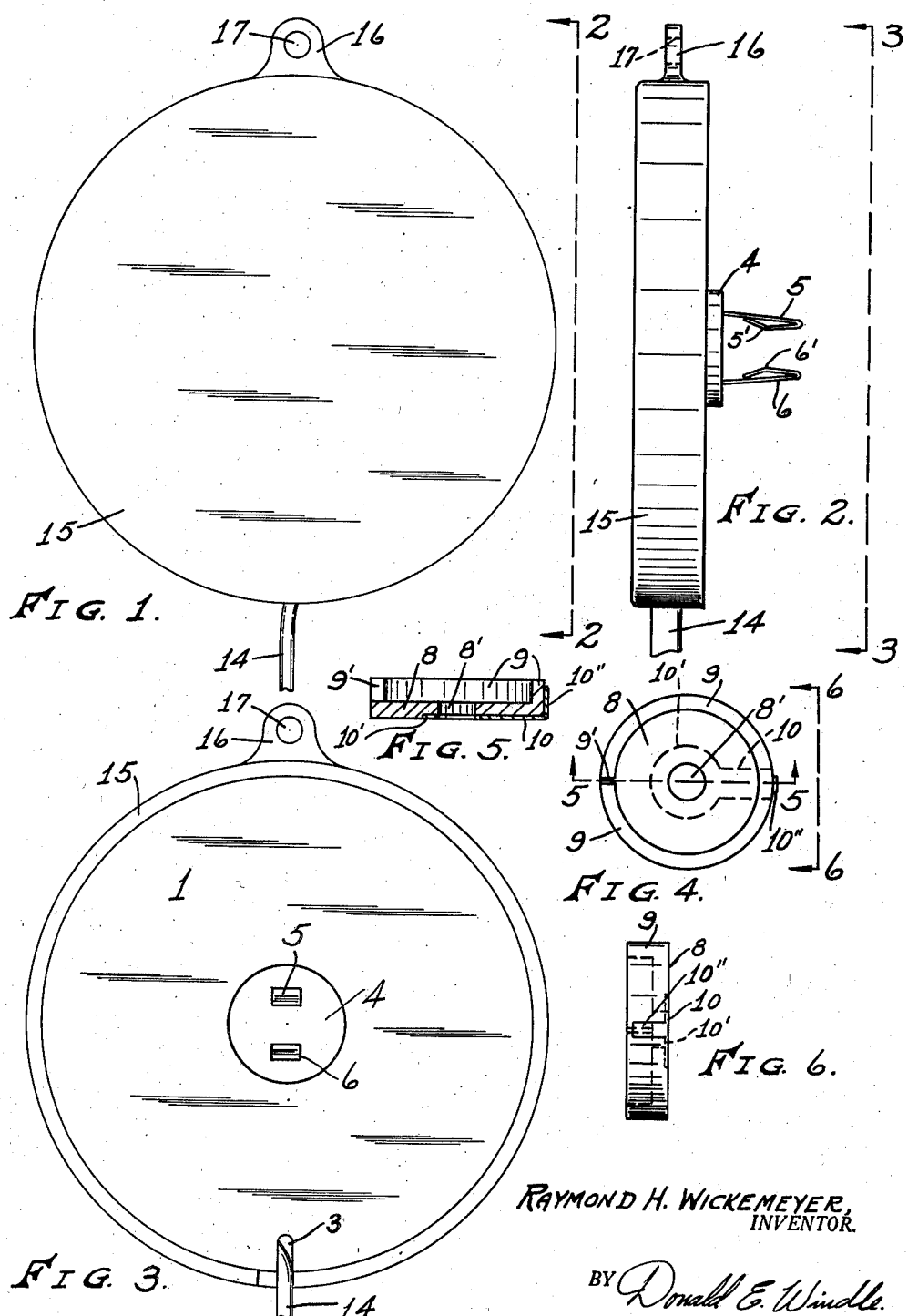

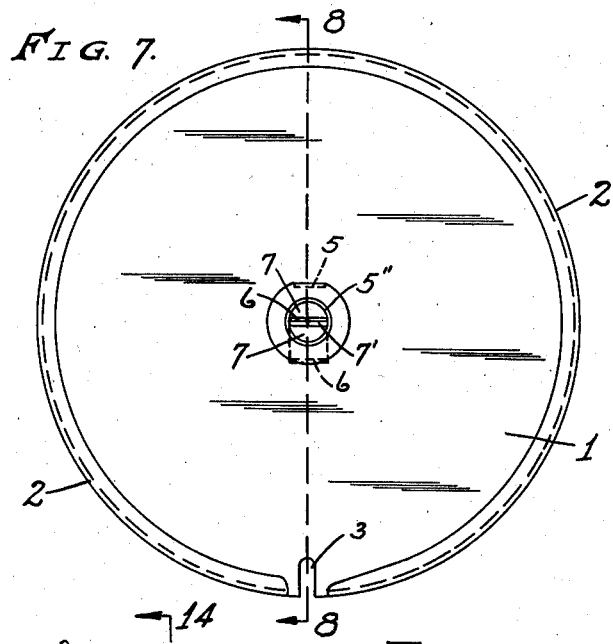
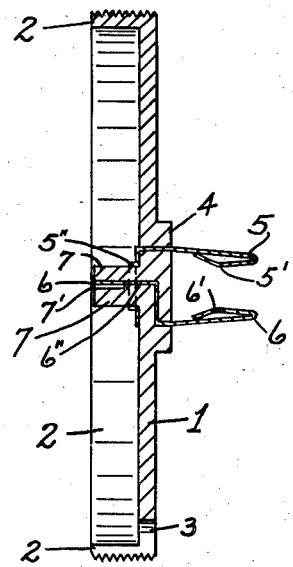
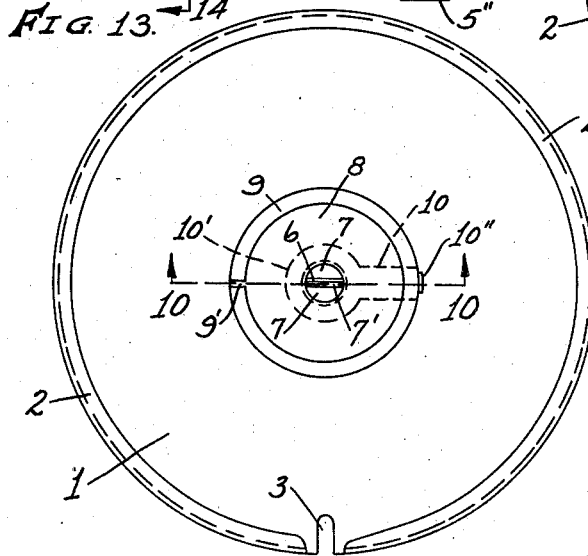
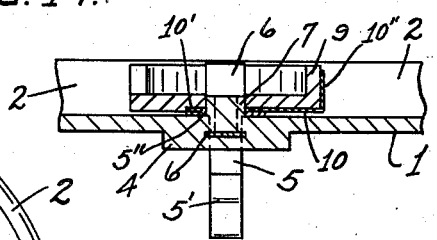
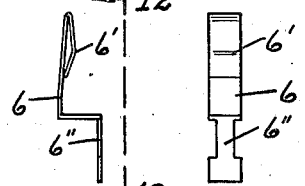

2,232,580

UNITED STATES PATENT OFFICE 2,232,580

HOUSING FOR ELECTRIC EXTENSION CORDS

Raymond H. Wickemeyer, Richmond, Ind.

Application May 8, 1939, Serial No. 272,455

1 Claim. (Cl. 191—12.4)

My present invention relates to the construction of housings for electric extension cords, providing a plug-in on the exterior thereof and integral therewith, and with a means being provided within the housing causing the extension cord to be retracted when desired.

Another object of the invention is the provision of a housing providing a repository for a length of extension cord with means provided within the housing automatically maintaining the extended portion of the cord in taut condition when the same is connected with an electrical appliance.

Another object of the invention is the provision of a housing member in which an extension cord may be coiled when not in use, and with the housing being compact and occupying a minimum of space.

Another object of the invention is the provision of a housing for an extension cord and having a retracting means located therein, and with the retracting means forming a part of an electric circuit when the extension cord is in use.

A further object of the invention is the provision of a housing comprising a pair of companion members one cooperating with the other, and both together forming a means for maintaining an extended portion of extension cord in the desired condition with respect to the length thereof.

A still further object of the invention is the provision of a housing for an electric extension cord comprising a minimum number of parts, which is simple of construction and operation, and which may be economically manufactured.

Other objects and advantages of the invention will suggest themselves in the course of the following description, and that which is new will be pointed out in the appended claim.

The preferred manner of carrying out the principles of the invention in a practical and efficient manner is shown in the accompanying three sheets of drawings, in which—

Figure 1 is a front elevational view of the assembled device.

Figure 2 is a side elevational view of the device taken from line 2—2 of Figure 1.

Figure 3 is a rear elevational view of the device taken from line 3—3 of Figure 2.

Figure 4 is a detail front elevation of the revolvable hub member.

Figure 5 is a detail sectional view through the hub member, taken on line 5—5 of Figure 4.

Figure 6 is a detail edge or side elevation of the hub member taken from line 6—6 of Figure 4.

Figure 7 is a front elevational view of the body member of the housing.

Figure 8 is a detail sectional view through the body member, taken on line 8—8 of Figure 7.

Figure 9 is a detail front elevation of the body member with the hub member being shown in place.

Figure 10 is a detail sectional view through the hub member and a portion of the body member, taken on line 10—10 of Figure 9.

Figures 11 and 12 are both detail elevations of one of the contact prongs.

Figures 13 and 14 are both detail elevations of the second contact prong.

Figure 15 is a front elevational view of the body member, the hub member, the retracting spring, and the extension cord in assembled condition, but with the cap member being removed therefrom.

Figure 16 is a detail view showing the condition of the inner end portion of the extension cord before the same is secured in place on the hub member.

Figure 17 is a partial detail section showing the position of the outwardly projecting portion of the extension cord while the cap member is being threaded onto the body member.

Figure 18 is a partial front elevation showing a portion of the cap member broken away, and illustrating the manner in which the extension cord passes out of and into the housing.

Figure 19 is a detail similar to Figure 18 except that the cap member is shown in engaging and binding condition with relation to the extension cord.

Figures 20 and 21 are detail views of the housing, taken from lines 20—20 and 21—21 of Figures 18 and 19 respectively.

Similar characters of reference designate like parts throughout the several views.

In order that the construction, the advantages, and the utilization of the invention may be more fully understood and appreciated, I will now take up a detailed description thereof, in which I will set forth the same as fully and as comprehensively as I may, reference being had to the accompanying drawings.

In the drawings, 1 designates the body member of the housing, the same being preferably formed of Bakelite or other composition having insulating qualities, and which may be easily and economically moulded or otherwise formed into the desired shape. The body member has a back portion with an outer flange 2 formed integrally therewith, and projecting at right angles therefrom with relation thereto. The outer periphery of the flange 2 has threads formed therearound, as shown in Figures 8, 17, and 21. A notch 3 is formed through the body member adjacent the outer edge thereof, the purpose of which will be hereinafter set forth. The periphery of the flange 2 is broken by a space formed therein, and provides an opening through which the outer end portion of the extension cord is adapted to pass.

A circular-shaped rearwardly-projecting portion 4 is formed on the rear side of the body member 1, with the same providing a reinforcement for the contact prongs 5 and 6 which extend therethrough, as shown in Figure 8.

The prong members 5 and 6 each have a bent-over portion formed thereon with the bent-over portions being designated by the numerals 5' and 6' respectively, and with the portions 5' and 6' causing the prong members to wedge tightly in the receptacle provided therefor.

The inner end portion of the prong member 5 is circular in shape with an aperture being formed concentrically therethrough, and with the flange 5'' being formed thereon. A notch 5ª is formed in one edge of the member 5 to provide a space which is filled with the material forming the body, and thereby preventing endwise movement of the member 5 in the body. The purpose of the flange 5'' will be fully set forth hereinafter.

The prong member 6 is formed as shown in Figure 11, with a comparatively narrow portion 6'' being formed adjacent the inner or forward end thereof. The narrow portion 6'' provides for a greater thickness of insulation between the member 6 and the flange 5'' of the prong member 5, as shown in Figure 10.

Located concentrically with the flange 2, and projecting forwardly from the central portion of the body member 1 is the stud 7 which is formed integrally with and of the same material as the body member 1. A slot 7' is formed in the stud 7, as shown more clearly in Figures 7, 8 and 9. It will be noted from these figures and from Figure 10 that the inner end of the prong member 6 is exposed in the slot 7'.

The hub member 8, which is also formed of material similar to that of the body member, is revolvably mounted on the stud member 7 through the aperture 8'. The member 8 has a back portion together with an integrally formed flange 9. A slot 9' is formed through the flange 9, the purpose of which will be hereinafter set forth.

The contact member 10 is provided in the rear side of the hub 8 with the same having its outer surface substantially flush with the rear side of the hub member. A circular-shaped portion 10' is formed at one end of the member 10 with an aperture being formed through the central portion thereof and with the aperture being adapted to fit around and contact the flange 5'' of the prong member 5. The opposite end 10'' of the contact member 10 is turned over the flange 9 of the hub member, all as shown in Figures 4, 5, and 6. The end portion 10'' provides for the attachment of one strand of the electric extension cord 14.

A spiral spring 11 is provided as a retracting means with a hook 12 being provided at the inner end thereof which is adapted to fit snugly through the slot 7' of the stud 7, and with the spring contacting the forward end portion of the prong member 6, as shown in Figure 15. The outer end portion 13 of the spring 11 is bent so as to extend outwardly through the slot 9' of the hub member, as also shown in Figure 15. The outer end portion 13 of the spring provides for the securing of the end of the second strand of the electric extension cord 14.

The strands of the extension cord 14 are secured by means of solder, or by other suitable means. It may also be desirable to solder the connection of the inner end 12 of the spring and the forward end of the prong member 6 in the slot 7' and thereby insure a positive electrical connection.

The desired length of extension cord 14 is coiled about the flange 9 of the hub member until the desired length is coiled thereon. The outer end portion of the extension cord is carried through the slot 3 which is formed through the outer edge of the body member 1, as shown in Figure 17. The cap member 15 is then threaded onto the flange 2 of the body member. It is desirous and important that the cap member 15 be in tight condition with relation to the body member when the slots in the flanges of the two members coincide, as shown in Figures 18 and 20. It will be noted, from Figures 18 and 20 that the cord 14 may be brought out of the case or housing through the aperture formed by the two coinciding slots. It will also be noted, from Figures 19 and 21, that a slight movement of the cap member in a loosening or unthreading direction will cause a binding of the cord in the aperture formed by the two slots, and thereby preventing movement of the cord into or out of the housing.

The outer end portion of the extension cord may be provided with a suitable member for use with appliances, etc.

It will be noted that a lug 16 is formed on the outer periphery of the cap member with an aperture 17 being formed therethrough and providing a means for suspending the entire housing from a hook when the same is not in use.

The prongs 5 and 6 provide means for plugging the device into connection with the conventional female plug-in receptacle in the usual manner. The prong 5 is electrically connected with one strand of the extension cord 14 through the flanged portion 5'', the contact member 10, and the end portion 10'', to which the strand of wire is soldered or otherwise electrically connected. It will be noted, from Figure 10 that the portion 10' of the member 10 forms a contact with the flange 5'' of the prong 5. The prong 6 is electrically connected with the second strand of the extension cord 14 through the contact with the inner end 12 of the retracting spring 11 in the slot 7' of the stud 7, and with the outer end portion 13 of the spring being connected with the second strand of the extension cord in the manner described hereinbefore, and as shown in Figure 15.

It will be noted that when the cap member 15 is tightened on the body member as shown in Figures 18 and 20 the extension cord 14 may move freely into or out of the housing. When the cap is turned to the position as shown in Figures 19 and 21, a binding action is effected against the cord and preventing the movement thereof. It will be noted that when the desired length of cord is out of the housing, the cap member may be loosened slightly, with the action thereof binding the cord. It will also be noted that, should the retracting spring 11 possess sufficient strength to pull the cord inwardly when the cap is binding against the same, the inward pull of the cord will tend to tighten the cap on the body member.

It will be noted that, with the cord extending outwardly through the aperture formed by the slots formed in the flanges of the body member and the cap member, it is impossible for the cap to be accidentally unthreaded from the body member. When it is desired to remove the cap member, the cord is bent rearwardly and into the slot 3, after which the cap may be easily removed from the body member.

When the extension cord is pulled from the housing, the action thereof rotates the hub member together with the outer end of the retracting spring, and causing the spring to tighten around the stud 7. When the outer end of the extension cord is released, the tension of the retracting spring causes the hub member to rotate, and thereby coiling the extended length of the cord on the hub member, as shown in Figure 15.

It may also be stated that the devices, with certain modifications, may be adapted to be built into the bases of floor lamps, table lamps, and other accessories, with the extension cord being extensible therefrom to an outlet socket.

I desire that it be understood that the several parts constituting the device may be made of materials best suited for the same, and that I am not to be limited to any materials specified herein.

I also desire that it be understood that minor changes be made in the several details and in the arrangement of the parts herein shown and described, insofar as the changes may fall within the scope of the appended claim.

Having now fully shown and described the invention, what I claim, and desire to secure by Letters Patent of the United States, is;

In a housing having a length of electric extension cord coiled therein, a stud formed integrally with the housing, a hub member revolvably positioned on the stud, a pair of prongs projecting from the housing with one end of one of the prongs extending through a wall of the housing and encircling the stud, and with an end of the second prong extending through the same wall of the housing and extending longitudinally through the stud, a spiral spring yieldingly mounted within the hub member, means extending along one side of the hub member and connecting one strand of the extension cord with one of the prongs, and with the spiral spring forming a means connecting the second of the strands of the extension cord with the second of said prongs.

RAYMOND H. WICKEMEYER.